(12) United States Patent
Breen et al.

(10) Patent No.: US 9,389,106 B2
(45) Date of Patent: Jul. 12, 2016

(54) REMOTE SEAL PRESSURE MEASUREMENT SYSTEM FOR SUBSEA USE

(71) Applicant: Rosemount Inc., Chanhassen, MN (US)

(72) Inventors: Ivar Breen, Stavanger (NO); Brent W. Miller, Minnetonka, MN (US); Jay Scheldorf, Bellville, TX (US); Gokhan Aydar, Austin, TX (US); David Broden, Andover, MN (US)

(73) Assignee: Rosemount Inc., Chanhassen, MN (US)

( * ) Notice: Subject to any disclaimer, the term of this patent is extended or adjusted under 35 U.S.C. 154(b) by 401 days.

(21) Appl. No.: 13/785,175

(22) Filed: Mar. 5, 2013

(65) Prior Publication Data

US 2013/0233058 A1 Sep. 12, 2013

Related U.S. Application Data

(60) Provisional application No. 61/607,237, filed on Mar. 6, 2012.

(51) Int. Cl.
*G01L 7/08* (2006.01)
*G01F 1/44* (2006.01)
*G01L 19/00* (2006.01)

(52) U.S. Cl.
CPC . *G01F 1/44* (2013.01); *G01L 7/082* (2013.01); *G01L 19/0046* (2013.01)

(58) Field of Classification Search
CPC ..... G01L 13/025; G01L 13/026; G01L 13/00; G01L 19/147; G01F 1/34; G01F 1/36; G01F 1/38
See application file for complete search history.

(56) References Cited

U.S. PATENT DOCUMENTS 3,480,036 A * 11/1969 Weiner ................... F16L 41/06
                                                              137/318
4,679,567 A    7/1987 Hanlon et al. ................ 128/675
(Continued)

FOREIGN PATENT DOCUMENTS

CN          1131462         9/1996
CN          1447096         10/2003
(Continued)

OTHER PUBLICATIONS

"Corrosion Resistance of Hastelly Alloys", Haynes International, Inc., 1984, pp. 1-4 and 45.*
Invitation to Pay Additional Fees for PCT/US2013/029064, dated Apr. 16, 2014.
"Application of Hardgrove Alloy C-276 Material in Chemical Pressure Vessel", by Li, Petrochemical Design, col. 20, No. 1, pp. 36-38, Dec. 31, 2003.
(Continued)

*Primary Examiner* — David A Rogers
(74) *Attorney, Agent, or Firm* — Westman, Champlin & Koehler, P.A.

(57) ABSTRACT

A remote seal assembly for subsea applications is provided. The assembly includes an upper housing having a fluid coupling for coupling the remote seal to a process fluid pressure measurement device. A lower housing is coupled to the upper housing and has an interface that is configured to mount to a pressure vessel. The lower housing also has a process fluid inlet. An isolation diaphragm is disposed between the upper and lower housings. At least one of the upper housing, lower housing and isolation diaphragm are constructed from a material suitable for immersion in saltwater. In some embodiments, the lower housing has a shoulder disposed about the process fluid inlet and a plurality of self-energizing seals configured to couple the assembly to a venturi flow meter body. A subsea process fluid flow measurement system is also provided that includes a pressure transmitter and at least one subsea remote seal assembly.

20 Claims, 5 Drawing Sheets

(56) References Cited

U.S. PATENT DOCUMENTS

| | | | |
|---|---|---|---|
| 4,942,383 A | 7/1990 | Lam et al. | 338/42 |
| 5,000,047 A | 3/1991 | Kato et al. | |
| 5,022,270 A | 6/1991 | Rud, Jr. | 73/706 |
| 5,212,989 A | 5/1993 | Kodama et al. | 73/706 |
| 5,524,492 A | 6/1996 | Frick et al. | 73/706 |
| 5,637,802 A | 6/1997 | Frick et al. | 73/724 |
| 5,665,899 A | 9/1997 | Willcox | 73/1.63 |
| 5,668,322 A | 9/1997 | Broden | 73/756 |
| 5,680,109 A | 10/1997 | Lowe et al. | 340/608 |
| 5,731,522 A | 3/1998 | Sittler | 73/708 |
| 6,038,961 A | 3/2000 | Filippi et al. | 92/98 |
| 6,079,276 A | 6/2000 | Frick et al. | 73/718 |
| 6,082,199 A | 7/2000 | Frick et al. | 73/724 |
| 6,089,097 A | 7/2000 | Frick et al. | 73/718 |
| 6,151,557 A | 11/2000 | Broden et al. | 702/47 |
| 6,253,624 B1 | 7/2001 | Broden et al. | 73/861.44 |
| 6,425,290 B2 | 7/2002 | Wilcox et al. | 73/715 |
| 6,457,367 B1 | 10/2002 | Behm et al. | 73/753 |
| 6,473,711 B1 | 10/2002 | Sittler et al. | 702/138 |
| 6,480,131 B1 | 11/2002 | Roper et al. | 341/155 |
| 6,484,585 B1 | 11/2002 | Sittler et al. | 73/718 |
| 6,505,516 B1 | 1/2003 | Frick et al. | 73/718 |
| 6,508,129 B1 | 1/2003 | Sittler | 73/756 |
| 6,516,671 B2 | 2/2003 | Romo et al. | 73/718 |
| 6,520,020 B1 | 2/2003 | Lutz et al. | 73/706 |
| 6,561,038 B2 | 5/2003 | Gravel et al. | 73/729.2 |
| 6,843,139 B2 | 1/2005 | Schumacher et al. | 73/861.63 |
| 6,848,316 B2 | 2/2005 | Sittler et al. | 73/706 |
| 6,966,229 B2 | 11/2005 | Seegberg | 73/754 |
| 7,000,478 B1 | 2/2006 | Zwollo et al. | |
| 7,036,381 B2 | 5/2006 | Broden et al. | 73/708 |
| 7,962,294 B2 | 6/2011 | Dozoretz et al. | 702/50 |
| 8,122,771 B2 | 2/2012 | Seegberg et al. | 73/756 |
| 2002/0023499 A1 | 2/2002 | Boehler et al. | |
| 2002/0100333 A1 | 8/2002 | Gravel et al. | 73/756 |
| 2003/0117837 A1 | 6/2003 | Park et al. | 365/158 |
| 2003/0177837 A1 | 9/2003 | Broden et al. | 73/716 |
| 2005/0193825 A1 | 9/2005 | Otsuka | 73/715 |
| 2005/0248434 A1 | 11/2005 | Kurtz et al. | 338/42 |
| 2006/0162458 A1 | 7/2006 | Broden | |
| 2008/0006094 A1 | 1/2008 | Schulte et al. | 73/736 |
| 2008/0053242 A1 | 3/2008 | Schumacher | 73/861.42 |
| 2008/0110269 A1* | 5/2008 | Strietzel | G01L 9/0075 73/718 |
| 2008/0245158 A1 | 10/2008 | Hedtke | |
| 2009/0000393 A1 | 1/2009 | Nyfors et al. | 73/861.19 |
| 2009/0165424 A1 | 7/2009 | Lutz | |
| 2009/0293625 A1 | 12/2009 | Sundet et al. | 73/708 |
| 2010/0064816 A1* | 3/2010 | Filippi | G01L 19/0645 73/715 |
| 2010/0198547 A1 | 8/2010 | Mulligan et al. | 702/100 |
| 2012/0046870 A1 | 2/2012 | Lievois et al. | 702/12 |
| 2012/0079884 A1 | 4/2012 | Broden et al. | 73/717 |
| 2013/0047737 A1* | 2/2013 | Vagle | G01L 19/0645 73/716 |
| 2013/0068029 A1* | 3/2013 | Romo | G01L 13/026 73/706 |
| 2013/0074604 A1 | 3/2013 | Hedtke et al. | |
| 2013/0160560 A1 | 6/2013 | Strei et al. | 73/706 |
| 2014/0213103 A1 | 7/2014 | Ohmeyer et al. | 439/571 |
| 2014/0260644 A1 | 9/2014 | Sahagen | 73/708 |
| 2015/0000417 A1 | 1/2015 | Hedtke et al. | 73/724 |

FOREIGN PATENT DOCUMENTS

| | | |
|---|---|---|
| CN | 1777790 | 5/2006 |
| CN | 102162762 | 8/2011 |
| CN | 203069314 | 7/2013 |
| DE | 10 2010 041 170 | 3/2011 |
| EP | 1 116 943 | 6/2013 |
| JP | 02-141635 | 5/1990 |
| JP | 10-096656 | 4/1998 |
| JP | 10-160530 | 6/1998 |
| JP | 2002-022586 | 1/2002 |
| JP | 2011-123011 | 6/2011 |
| WO | WO 95/08759 | 3/1995 |
| WO | WO 01/61219 A2 | 8/2001 |
| WO | WO 2010/141655 A2 | 12/2010 |
| WO | WO 2011/000423 | 1/2011 |

OTHER PUBLICATIONS

Office Action from Australian Application No. 2012359068, dated Jul. 15, 2014.
Office Action from Chinese Application No. 2012105061303, dated Jun. 10, 2014.
Office Action from European Application No. 12809549.4, dated Jul. 29, 2014.
International Search Report and Written Opinion of the International Searching Authority dated Jun. 5, 2013 for International Application No. PCT/US2012/070545, filed Dec. 19, 2012.
General Specifications EJX110A Differential Pressure Transmitter, Jan. 1, 2009. Retrieved from Internet : http://web.archive.org/web/20090407093933/http://www.yokogawa.com/fld/pdf/ejx/GS01C25B01-01E.pdf.
Hibner, E.L. and L.E. Shoemaker: "The Advantages of Nickel Alloys for Seawater Service, a New Generation of High Strength, Corrosion-Resistant Superalloy Products for Military Springs, Fasteners and Hardware". Special Metals Corporation, Huntington, WV 25705.
Fuji Electric—Differential Pressure Transmitters for the Oil and Gas Industry. www.offshore-technology.com/contractors/instrumentation/fuji-electric/fuji-electric1.html.
Office Action from U.S. Appl. No. 13/630,547, dated Aug. 22, 2014.
Invitation to Pay Additional Fees for International Application No. PCT/US2014/052660, dated Dec. 18, 2014.
International Search Report and Written Opinion of the International Searching Authority for International Application No. PCT/US2014/040632, dated Dec. 3, 2014.
Office Action from Chinese Application No. 201210506130.3, dated Jan. 14, 2015.
Product Data Sheet 00813-0100-4716, Rev. LA, Rosemount 3095 MultiVariable "The Proven Leader in Multivariable Mass Flow Measurement", dated Dec. 31, 2008.
Notification of Transmittal of the International Searching Report and the Written Opinion of the International Searching Authority from PCT/US2014/049019, dated Jan. 20, 2015.
International Search Report and Written Opinion of the International Searching Authority for International Application No. PCT/US2014/052660, dated Mar. 31, 2015.
Office Action from Australian Patent Application No. 2013230135, dated Apr. 2, 2015.
International Search Report and Written Opinion of International Application No. PCT/2013/029064 dated May 28, 2014 (16 pages).
Office Action from Chinese Application Serial No. 201380007242.7, dated Apr. 28, 2015.
Patent Examination Report No. 1 for Australian Patent Application No. 2013230135, dated Nov. 26, 2014, 3 pages.
Communication pursuant to Rules 161(1) and 162 EPC for European Patent Application No. 13710942.7-1610, dated Dec. 2, 2014, 2 pages.
Office Action from U.S. Appl. No. 14/037,805, dated Jun. 15, 2015.
Invitation to Pay Additional Fees along with Annex to Form PCT/ISA/206 Results of the Partial International Search from PCT/US2015/048821, dated Nov. 12, 2015.
Office Action from Canadian Patent Application No. 2,866,380, dated Nov. 4, 2015.
Office Action from Russian Patent Application No. 2014140187, dated Nov. 9, 2015.
Office Action from Japanese Application Serial No. 2014-561027, dated Aug. 25, 2015.
Office Action from Japanese Patent Application No. 2014-561027, dated Jan. 19, 2016.

* cited by examiner

REMOTE SEAL PRESSURE MEASUREMENT SYSTEM FOR SUBSEA USE

CROSS-REFERENCE TO RELATED APPLICATION

The present application is based on and claims the benefit of U.S. provisional patent application Ser. No. 61/607,237, filed Mar. 6, 2012, the content of which is hereby incorporated by reference in its entirety.

BACKGROUND

Industrial process control systems are used to monitor and control industrial processes used to produce or transfer fluids or the like. In such systems, it is typically important to measure "process variables" such as temperatures, pressures, flow rates, and others. Process control transmitters are used to measure such process variables and transmit information related to the measured process variable back to a central location such as a central control room.

One type of process variable transmitter is a pressure transmitter which measures process fluid pressure and provides an output related to the measured pressure. This output may be a pressure, a flow rate, a level of a process fluid, or other process variable that can be derived from the measured pressure. The pressure transmitter is configured to transmit information related to the measured pressure back to a central control room. The transmission is typically over a two wire process control loop, however, other communication techniques are sometimes used, including wireless techniques.

The pressure must be coupled to a process variable transmitter through some type of process coupling. In certain process pressure measurement applications, the pressure transmitter is located remotely relative to a pressurized process fluid, and pressure is physically conveyed from the process fluid to the pressure transmitter through a fluid link using a device called a remote seal. A remote seal is a secondary system that is filled with a substantially incompressible fluid that transmits pressure from the process fluid to the pressure transmitter. Remote seals are typically used in applications where the process fluid has a high temperature, is corrosive, or has some other extreme application or characteristic that could damage or disrupt the pressure transmitter if the pressure transmitter were located too close to the process fluid.

SUMMARY

A remote seal assembly for subsea applications is provided. The assembly includes an upper housing having a fluid coupling for coupling the remote seal to a process fluid pressure measurement device. A lower housing is coupled to the upper housing and has an interface that is configured to mount to a pressure vessel. The lower housing also has a process fluid inlet. An isolation diaphragm is disposed between the upper and lower housings. At least one of the upper housing, lower housing and isolation diaphragm are constructed from a material suitable for immersion in saltwater. In some embodiments, the lower housing has a shoulder disposed about the process fluid inlet and a plurality of self-energizing seals configured to couple the assembly to a venturi flow meter body. A subsea process fluid flow measurement system is also provided that includes a pressure transmitter and at least one subsea remote seal assembly.

DETAILED DESCRIPTION OF ILLUSTRATIVE EMBODIMENTS

One particularly challenging environment for pressure measurement is subsea applications. In such applications, the static pressure to which the process equipment is exposed can be quite high. Moreover, the salt water is corrosive to many metals. Providing a remote seal system that is able to withstand the challenges of subsea use while reducing or minimizing costs associated with subsea adaptations of the process equipment would benefit subsea process control applications.

Figure 1:
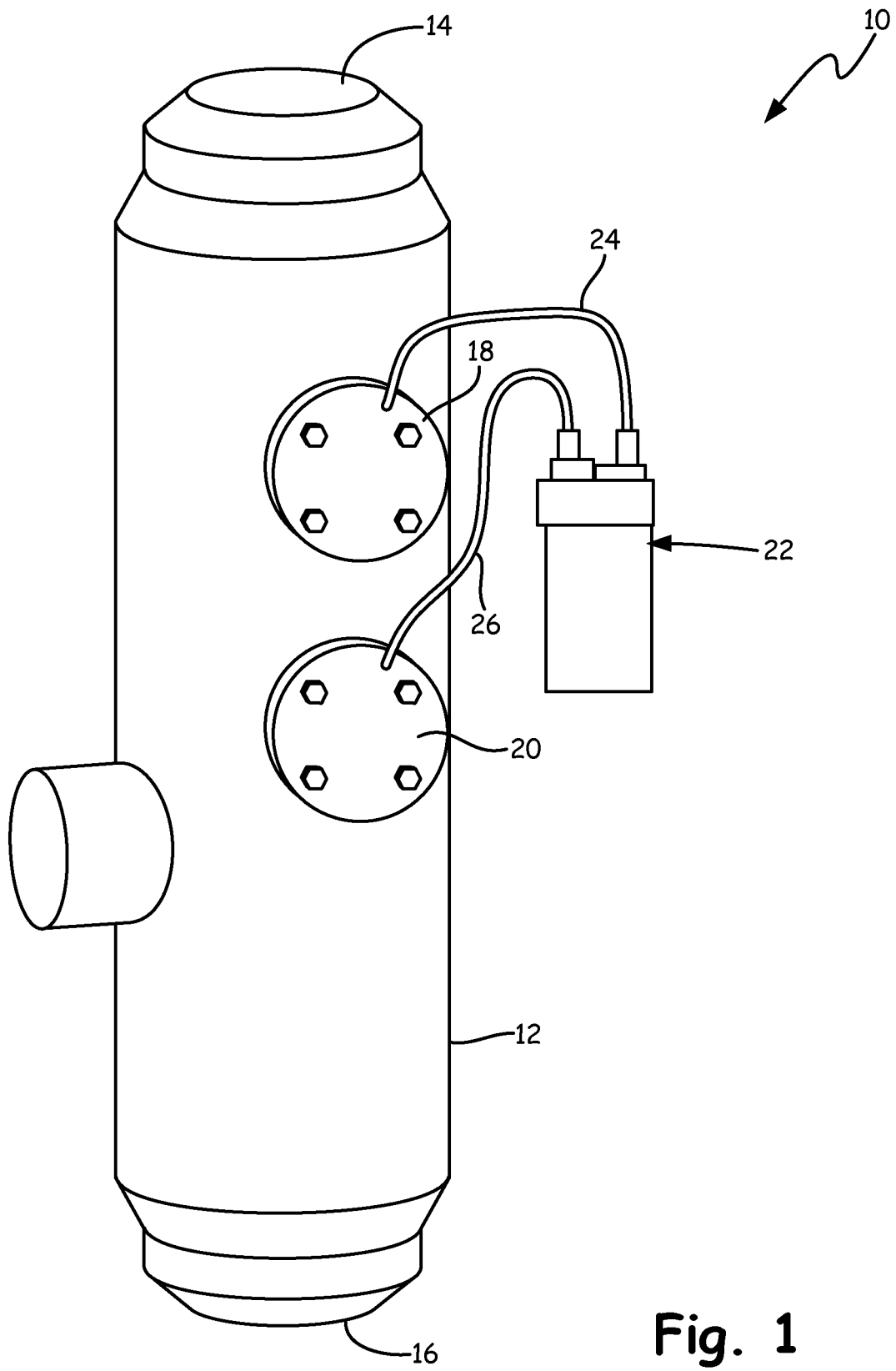
FIG. 1 is a diagrammatic view of a subsea process fluid measurement system in accordance with embodiments of the present invention.

FIG. 1 is a diagrammatic view of a subsea process fluid measurement system in accordance with embodiments of the present invention. System 10 includes a venturi-type flow conduit 12 having a pair of openings 14, 16 which couple to a pipe in a process system. Venturi flow meter body 12 has a constricted throat region therein (See FIG. 2). Pressures measured along the flow path in the throat region of venturi flow meter body 12 can provide an indication of process fluid flow. In order to measure pressure at multiple points along the flow stream within flow meter body 12, a pair of remote seals 18, 20 is employed. Each remote seal 18, 20 conveys the pressure of the process fluid at each remote seal's respective point in or along the flow path to a pressure measurement device, such as differential pressure transmitter 22. The pressure is passed from remote seals 18, 20 to differential pressure transmitter 22 through lines 24, 26 respectively. Differential pressure transmitter 22 can be a known differential pressure transmitter that provides an indication of the difference in the two pressures provided or otherwise conveyed by remote seals 18, 20 in accordance with known techniques. As can be appreciated from FIG. 1, if remote seals 18, 20 are required to be of a certain size in order to withstand the pressures of subsea applications, their size must generally be accommodated by venturi flow meter body 12, to which they mount. Accordingly, it is desirable to minimize the size of remote seals 18, 20 such that smaller assembly is provided. Moreover, as the size of the remote seals grows, the necessity of using more and more bolts to robustly mount the remote seal to the venturi flow meter body is required. As shown in FIG. 1, some embodiments of the present invention allow the remote seals 18, 20 to be mounted to venturi flow meter body 12 by as little as 4 bolts.

Figure 2:
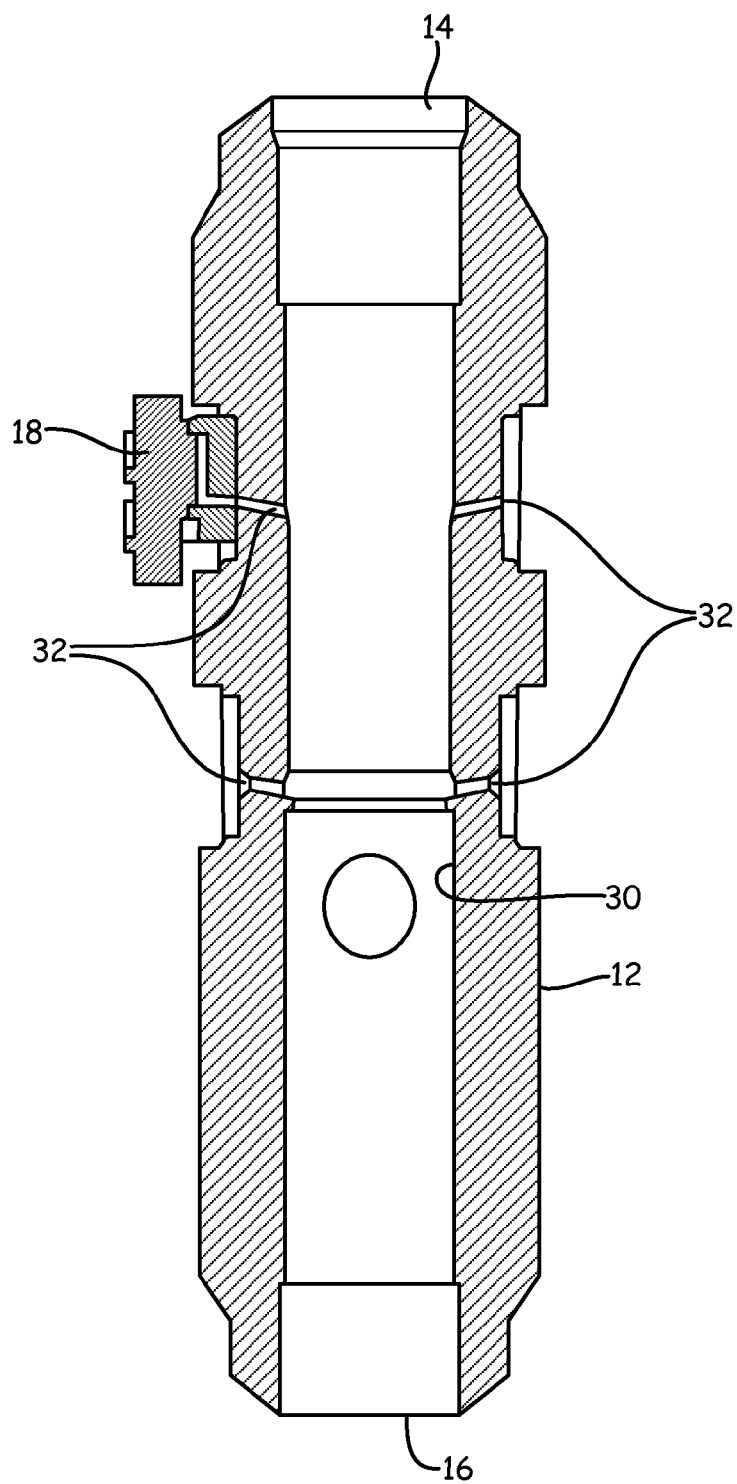
FIG. 2 is a diagrammatic cross-sectional view showing a remote seal mounted to a venturi flow meter body in accordance with an embodiment of the present invention.

FIG. 2 is a diagrammatic cross-sectional view showing remote seal 18 mounted to venturi flow meter body 12 in accordance with an embodiment of the present invention. Venturi flow meter body 12 has a throat 30 having a diameter that is constricted relative to the diameters of openings 14, 16. Additionally, venturi flow meter body 12 has a plurality of pressure taps 32 disposed along the fluid flow path within throat 30. Remote seal 18 is mounted proximate one of fluid taps 32 and has a deflectable isolation diaphragm that contacts process fluid contained in tap 32. The deflection of the isolation diaphragm in response to pressure of process fluid in tap 32 passes pressure into a secondary fluid filled system that conveys the pressure through line 24 through a differential pressure sensor or other suitable pressure sensor. In this way, the pressure at the tap 32, to which remote seal 18 is mounted, can be safely measured even though the temperature and/or pressure may be too high for pressure transmitter 22 to be mounted to or proximate tap 32.

In accordance with embodiments of the present invention, remote seals 18, 20 are designed such that they are able to withstand over 15,000 psi line pressure in subsea conditions while minimizing the size of seals 18, 20 and the footprint of the subsea venturi meter body used to measure flow. As will be set forth in greater detail below, remote seals 18, 20 preferably use special attachment mechanisms to minimize the diameter to which the over 15,000 psi line pressure is applied. Further, remote seals in accordance with embodiments of the present invention are preferably made entirely of alloy C276 and feature a welded design to meet the challenge of the 15,000 psi line pressure.

Alloy C276 is an example of a material suitable for immersion in saltwater. Alloy C276 is available from Haynes International Inc. of Kokomo, Ind. under the trade designation Hastelloy C276. Alloy C276 has the following chemical composition (by percent weight): Molybdenum 15.0-17.0; Chromium 14.5-16.5; Iron 4.0-7.0; Tungsten 3.0-4.5; Cobalt 2.5 maximum; Manganese 1.0 maximum; Vanadium 0.35 maximum; Carbon 0.01 maximum; Phosphorus 0.04 maximum; Sulfur 0.03 maximum; Silicon 0.08 maximum and Balance Nickel. Alloy C276 provides excellent corrosion resistance in salt water applications, and very high strength.

Figure 3:
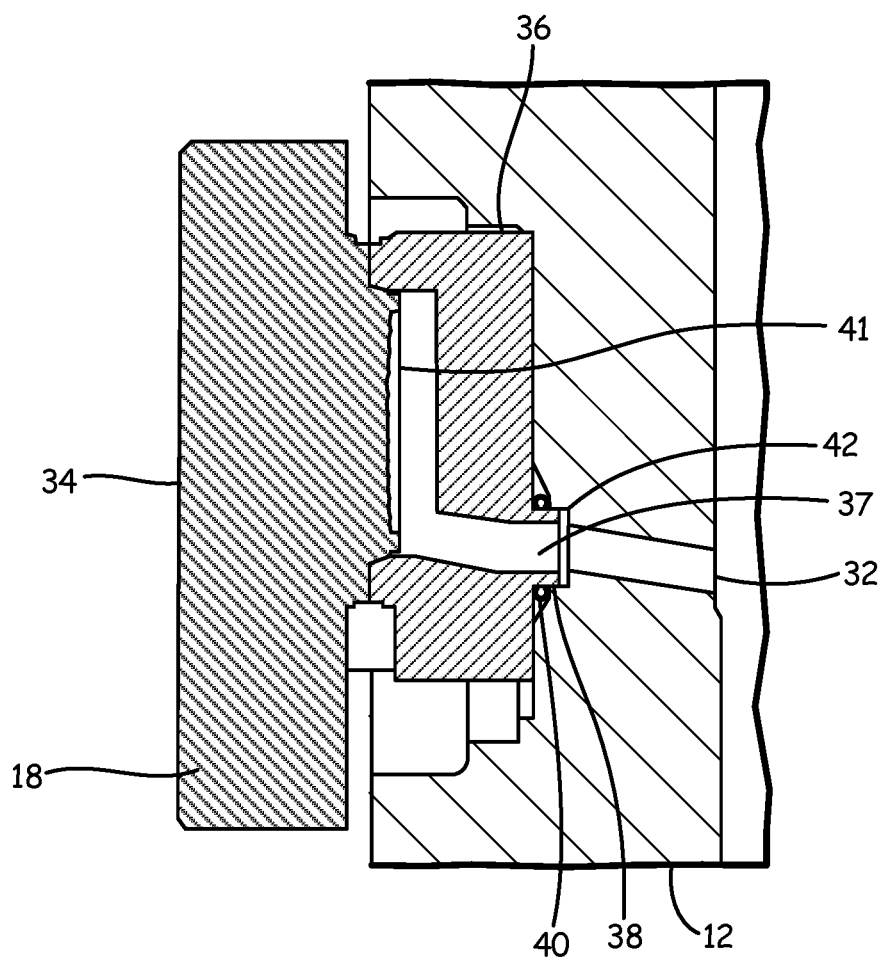
FIG. 3 is an enlarged view of a remote seal mounted to a venturi flow meter body in accordance with an embodiment of the present invention.

FIG. 3 is an enlarged view of remote seal 18 mounted to venturi flow meter body 12 in accordance with embodiments of the present invention. Remote seal 18 is comprised of upper housing 34, and lower housing 36 that are welded together during the manufacturer of remote seal 18. The weld between upper housing 34 and lower housing 36 is preferably accomplished via an E-beam weld. Additionally, a deflectable diaphragm (shown in FIG. 5) is positioned between upper housing 34 and lower housing 36. The diaphragm is preferably welded to upper housing 34 via a TIG weld. In order to robustly seal remote seal 18 to body 12, a plurality of c-rings are preferably used. A first c-ring is disposed about shoulder 38 as indicated at reference numeral 40. A second c-ring is sandwiched between an end surface of shoulder 38 and an opposing surface of flow meter body 12 as indicated as reference numeral 42. A c-ring is often interchangeable with an O-ring but are self-energizing under pressure. Accordingly, the utilization of a pair of c-rings for sealing remote seal 18 to body 12 provides a redundant self-energizing seal under pressure.

As shown in FIG. 3, pressure taps 32 generally contain a slope with respect to the fluid flow path. This slope is arranged such that when the venturi flow meter body is placed vertically, the slope is in a downward direction. In accordance with an embodiment of the present invention, lower housing 36 has a pressure inlet 37 that couples to pressure tap 32, where the pressure inlet also contains a slope. In this manner, if any hydrates or other undesirable substances form in pressure inlet 37 of lower housing 36, they will simply drain with the assistance of gravity into and through venturi flow meter body 12. This angled feature is preferably machined to extend from venturi flow meter body 12 to diaphragm 41 at an angle that ensures that all potential hydrates are drained, in the case of a flow shutdown or other hydrate-forming scenario. This is important because when hydrates form, cavities and tubes can become blocked or they could create a localized pressure build up leading to potential catastrophic damage to the remote seal system.

Figure 4:
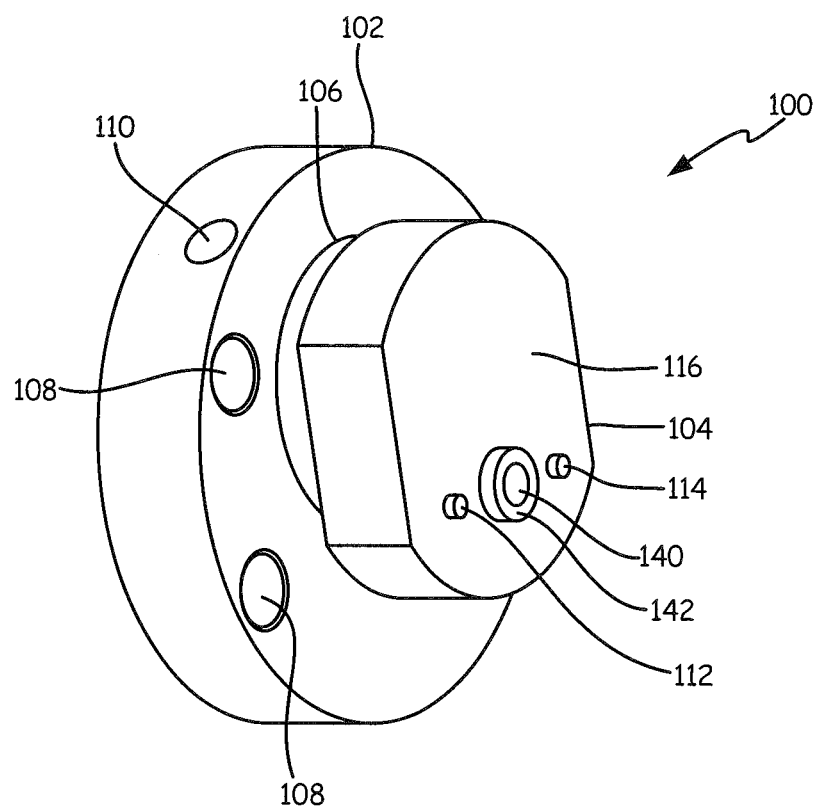
FIG. 4 is a diagrammatic perspective view of a remote seal in accordance with an embodiment of the present invention.

FIG. 4 is a diagrammatic perspective view of a remote seal 100 in accordance with an embodiment of the present invention. Remote seal 100 includes upper housing 102 and lower housing 104 which are welded together, preferably using an electron beam (E-beam) weld at interface 106. An E-beam weld is a fusion welding process in which a beam of high-velocity electrons is applied to the materials being joined. As indicated in FIG. 4, upper housing 102 includes a plurality (preferably 4) of bolt holes 108 which facilitate mounting remote seal 100 to a pressure vessel, such as venturi flow meter body 12 (shown in FIG. 1). Upper housing 102 also includes fluid connection port 110 that couples to hydraulic lines, such as lines 24, 26 shown in FIG. 1. Preferably connection port 110 is a common welded 13 millimeter connection. The 13 millimeter connection in port 110 of upper housing 102 allows a standard connection using a known fitting, capillary and fill tube for oil fill and connection to a differential pressure transmitter.

Lower housing 104 preferably includes a plurality of alignment features 112, 114 that protrude from surface 116 of lower housing 104 such that they are received in cooperative features in the pressure vessel such as a venturi flow meter body. In this way, precise alignment of lower housing 104 to the pressure vessel can be achieved while the remote process seal is being mounted in place. This is important to ensure that the c-rings are compressed with substantially pure axial movement since rotation of the process seal during compression could damage the c-rings. Alignment features 112, 114 are preferably comprised of press-fit pins that are engaged into surface 116 of lower housing 104. Features 112, 114 allow proper installation with venturi flow meter body 12. While it is preferred that features 112, 114 be press-fit, they may be formed in any suitable manner in accordance with embodiments of the present invention.

Lower housing 104 also includes a protruding shoulder 140 that is received in a corresponding port proximate a pressure tap of the venturi flow meter body. Shoulder 140 has an outer circumference about which a first c-ring is positioned. In one embodiment, the first c-ring that is disposed about shoulder 140 has a diameter that is approximately 0.854 inches. Additionally, shoulder 140 also has an end face 142 which compresses a smaller, second c-ring between end face 142 and an opposing surface of venturi flow meter body 12. In one embodiment, the diameter of the second c-ring is about 0.578 inches.

The utilization of a pair of c-rings at the interface between lower housing 104 and the venturi flow meter body provides a robust, self-energizing seal of very high integrity. This allows as little as 4 bolts to be used for adequate force retention to mount remote seal 100 to a venturi flow meter, or other suitable pressure vessel. For comparison, a typical remote seal design to reach 15,000 psi pressures generally has a diameter of approximately 7 inches, thickness of 2½ inches, and requires 12 to 16 bolts to mount to a pressure vessel. Remote seals in accordance with embodiments of the present invention may be as small as 5 inches in diameter, 1.125 inches thick, and can bolt to the meter body with as little as 4 bolts. Further still, the foot print of the seal on the meter body is also significantly decreased, enabling a smaller, lower-cost meter body to be used.

Figure 5:
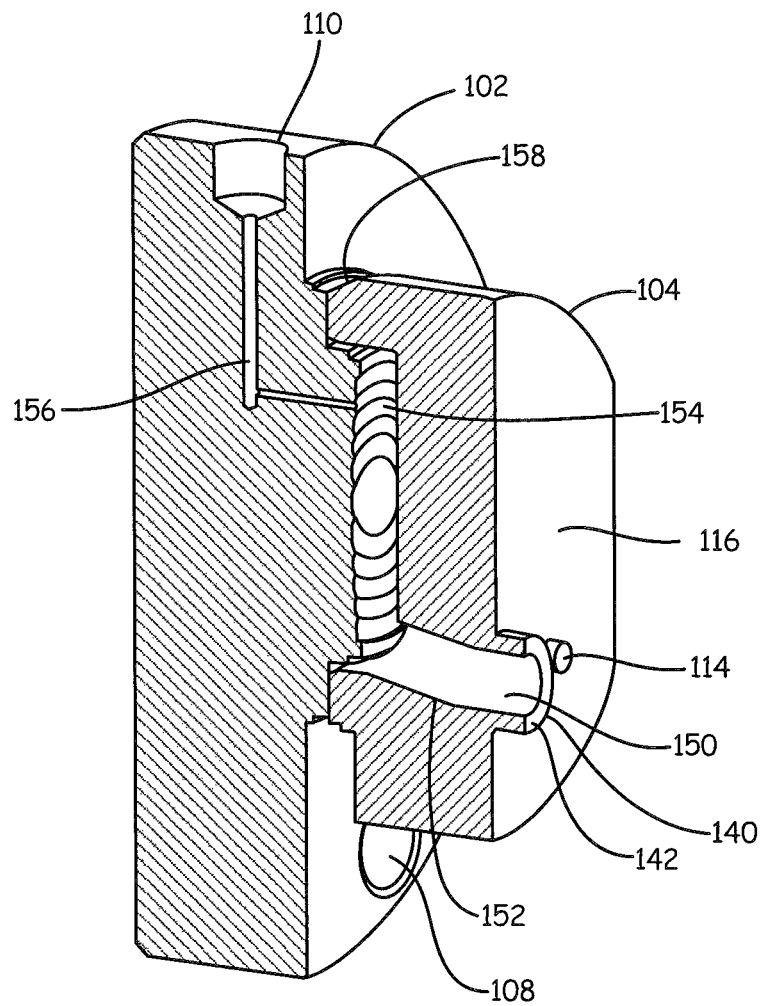
FIG. 5 is a diagrammatic cross-sectional view of a remote seal in accordance with an embodiment of the present invention.

FIG. 5 is a diagrammatic cross-sectional view of remote seal 100 in accordance with an embodiment of the present invention. FIG. 5 shows many of the same components illustrated in FIG. 4, but by virtue of the cross section, shows many internal components. Specifically, shoulder 140 is part of pressure inlet 150 that receives process fluid from the pressure vessel. The process fluid passes through sloped portion 152 and bears against deflectable diaphragm 154. As diaphragm 154 deflects, fluid within conduit 156 moves slightly and conveys the pressure through port 110 to a suitable pressure measurement device, such as differential pressure transmitter 22 (shown in FIG. 1). Deflectable diaphragm 154 is preferably welded to upper housing 102. This weld is preferably accomplished via a known TIG weld. Additionally, lower housing 104 is then mounted to upper housing 102 via a weld. The weld between upper housing 102 and lower housing 104 occurs at interface 158 and is preferably an E-beam weld. It is also preferred that deflectable diaphragm 154 be constructed of the same materials as upper housing 102 and lower housing 104. More preferably, all of upper housing 102, lower housing 104, and diaphragm 154 are constructed from alloy C276. When so constructed, it is further preferred that diaphragm 154 have a thickness of 0.003 inches. This diaphragm meets pressure requirements in both process and failure conditions. Further, it is also preferred that diaphragm 154 have a diameter of approximately 1.9 inches. When so configured, diaphragm 154 maintains acceptable performance at all temperature ranges, with proper fill fluid, such as silicone oil, or other suitable fill fluids. While Alloy C276 may be a higher-cost alloy than other corrosion-resistant alloys, the reduction in the physical size of the process seal using various features and embodiments of the present invention allows the entire remote seal to be able to be manufactured from Alloy C276 cost effectively. However, embodiments of the present invention can be practiced with other alloys, if suitable qualification steps are taken. Other possible materials include duplex stainless steel and Alloy 625 or other suitable nickel-based alloys. Additionally, while embodiments of the present invention generally employ a remote seal that is bolted to a venturi flow meter body, embodiments of the present invention can be practiced where the remote seal is welded directly to the venturi flow meter body. In such embodiments, an E-beam weld to the meter body is preferred.

Although the present invention has been described with reference to preferred embodiments, workers skilled in the art will recognize that changes may be made in form and detail without departing from the spirit and scope of the invention.

What is claimed is:

1. A remote seal assembly for subsea applications, the assembly comprising:
    an upper housing having a fluid coupling for coupling the remote seal assembly to a process fluid pressure measurement device;
    a lower housing coupled to the upper housing and having an interface that is configured to mount to a pressure vessel, the lower housing also having a process fluid inlet, the lower housing includes a shoulder around the process fluid inlet configured to fit against the pressure vessel and seal the inlet to a pressure tap in the pressure vessel;
    an isolation diaphragm disposed between the upper and lower housings; and
    wherein at least one of the upper housing, lower housing and isolation diaphragm are constructed from a material suitable for immersion in saltwater; and
    the housing includes a hydrate draining feature.

2. The remote seal assembly of claim 1, wherein at least the upper and lower housings are formed of Alloy C-276.

3. The remote seal assembly of claim 1, wherein the upper housing and lower housing are coupled together by a weld.

4. The remote seal assembly of claim 3, wherein the weld is an electron beam weld.

5. The remote seal assembly of claim 1, wherein the isolation diaphragm is welded to the upper housing.

6. The remote seal assembly of claim 5, wherein the isolation diaphragm is TIG welded to the upper housing.

7. The remote seal assembly of claim 1, wherein the entire remote seal assembly is formed of Alloy C-276.

8. The remote seal assembly of claim 1, wherein the upper housing includes no more than four mounting holes configured to pass mounting bolts therethrough.

9. The remote seal assembly of claim 1, and further comprising a plurality of self-energizing seals configured to couple the remote seal assembly to the pressure vessel.

10. The remote seal assembly of claim 9, wherein the self-energizing seals are c-rings.

11. The remote seal assembly of claim 10, wherein a first c-ring is disposed about the shoulder and a second c-ring is disposed between an axial face of the shoulder and the pressure vessel.

12. The remote seal assembly of claim 1, and further comprising at least one alignment feature configured to engage a cooperative feature of the pressure vessel to inhibit rotation of the lower housing with respect to the pressure vessel.

13. A subsea process fluid flow measurement system comprising:
    a venturi flow meter body configured to receive a fluid flow therethrough, the venturi flow meter body having a constricted throat region and a plurality of pressure taps disposed therein;
    at least one remote seal assembly mounted to a respective pressure tap on the venturi flow meter body, the remote seal assembly comprising:
        an upper housing having a fluid coupling for coupling the remote seal assembly to a process fluid pressure measurement device;
        a lower housing coupled to the upper housing and having an interface that is configured to mount to a pressure vessel, the lower housing also having a process fluid inlet;
        an isolation diaphragm disposed between the upper and lower housings;
        wherein at least one of the upper housing, lower housing and isolation diaphragm are constructed from a material suitable for immersion in saltwater;
    a pressure transmitter fluidically coupled to each at least one remote seal assembly; and
    wherein each remote seal assembly is mounted to the venturi flow meter body by no more than four bolts.

14. The subsea process fluid flow measurement system of claim 13, wherein the remote seal assembly includes a plurality of remote seal assemblies.

15. The subsea process fluid flow measurement system of claim 13, wherein the remote seal assembly is formed of Alloy C-276.

16. The subsea process fluid flow measurement system of claim 13, wherein the remote seal assembly includes a process fluid inlet that is coupled to the venturi flow meter body through a shoulder and a plurality of self-energizing seals.

17. The subsea process fluid flow measurement system of claim 16, wherein the self-energizing seals are c-rings.

18. The subsea process fluid flow measurement system of claim 17, wherein a first c-ring is disposed about the shoulder and a second c-ring is disposed between an axial face of the shoulder and the venturi flow meter body.

19. The subsea process fluid flow measurement system of claim 13, wherein the remote seal assembly further comprises at least one alignment feature engaged with a cooperative feature of the venturi flow meter.

20. The subsea process fluid flow measurement system of claim 13, wherein the remote seal assembly includes a draining feature.

* * * * *